US009976474B2

(12) United States Patent
Thompson et al.

(10) Patent No.: US 9,976,474 B2
(45) Date of Patent: May 22, 2018

(54) TURBOCHARGER SPEED ANOMALY DETECTION

(71) Applicant: Caterpillar Inc., Peoria, IL (US)

(72) Inventors: Scott Thompson, Dunlap, IL (US); Sravan Karri, Dunlap, IL (US); Michael Joseph Campagna, Chillicothe, IL (US)

(73) Assignee: Caterpillar Inc., Deerfield, IL (US)

( * ) Notice: Subject to any disclaimer, the term of this patent is extended or adjusted under 35 U.S.C. 154(b) by 100 days.

(21) Appl. No.: 15/098,665

(22) Filed: Apr. 14, 2016

(65) Prior Publication Data

US 2017/0298810 A1 Oct. 19, 2017

(51) Int. Cl.

*F02B 33/44* (2006.01)
*F02B 33/00* (2006.01)
*F02B 37/12* (2006.01)
*F02B 37/00* (2006.01)
*F02B 39/16* (2006.01)

(52) U.S. Cl.

CPC ............ *F02B 37/12* (2013.01); *F02B 37/001* (2013.01); *F02B 39/16* (2013.01); *F02B 2037/122* (2013.01)

(58) Field of Classification Search

CPC ...... F02B 37/12; F02B 37/001; F02B 37/007; F02B 39/16; F02B 2037/122; F02B 2039/162; F02B 2039/166; F02B 2039/168
USPC ............................ 60/611–612; 123/562, 463
See application file for complete search history.

(56) References Cited

U.S. PATENT DOCUMENTS 4,299,090 A * 11/1981 Deutschmann ....... F02B 37/007 60/612
5,845,495 A * 12/1998 Schray .................. F02B 37/007 60/612
6,202,415 B1 * 3/2001 Lohmann ............. F02B 37/007 60/612

(Continued)

FOREIGN PATENT DOCUMENTS

DE 102008054917 A1 1/2010
DE 102012212555 A1 2/2014
DE 102008034322 B4 6/2014

*Primary Examiner* — Thai Ba Trieu
(74) *Attorney, Agent, or Firm* — Baker Hostetler; Daniel A. Staley

(57) ABSTRACT

A process for monitoring turbocharger operation in a machine is disclosed. The machine includes a power source having an intake manifold for supplying the power source with air and a plurality of turbochargers. Each turbocharger includes an air inlet passageway to receive air, a plurality of pressure sensors arranged within the inlet passageway, a compressor configured to pressurize air, an air outlet passageway to direct pressurized air from the compressor to the intake manifold, and an exhaust turbine operably driven by exhaust gas from the power source and coupled to the compressor by a turbine shaft. The process includes monitoring the differential pressure across the air inlet passageway for each turbocharger, comparing the differential pressures for each turbocharger and indicating an anomaly in turbocharger speed when the differential pressure for one turbocharger exceeds the differential pressure for another turbocharger by a threshold amount.

9 Claims, 6 Drawing Sheets

(56) References Cited

U.S. PATENT DOCUMENTS

| | | | | |
|---|---|---|---|---|
| 6,256,992 | B1 * | 7/2001 | Lewis, Jr. | F02B 37/18 60/611 |
| 6,263,673 | B1 * | 7/2001 | Schmidt | F02B 37/007 60/612 |
| 6,314,737 | B1 * | 11/2001 | Springer | F02B 37/007 60/612 |
| 6,338,250 | B1 * | 1/2002 | Mackay | F02B 37/007 60/612 |
| 6,785,604 | B2 | 8/2004 | Jacobson | |
| 6,990,814 | B2 | 1/2006 | Boley et al. | |
| 7,353,102 | B2 * | 4/2008 | Narita | F02B 37/12 60/612 |
| 7,380,401 | B2 * | 6/2008 | Henn | F02B 37/007 60/612 |
| 7,730,724 | B2 | 6/2010 | Shu et al. | |
| 7,748,217 | B2 | 7/2010 | Muller | |
| 7,770,393 | B2 * | 8/2010 | Buckland | F02B 37/007 60/612 |
| 7,801,665 | B2 * | 9/2010 | Buckland | F02B 37/007 701/103 |
| 7,861,580 | B2 | 1/2011 | Sujan et al. | |
| 7,953,540 | B2 * | 5/2011 | Ito | F02B 37/007 701/103 |
| 7,987,040 | B2 * | 7/2011 | Buckland | F02B 37/007 701/103 |
| 8,397,499 | B2 * | 3/2013 | Doering | F02D 41/0007 60/612 |
| 8,534,123 | B2 | 9/2013 | Herman et al. | |
| 8,991,243 | B2 | 3/2015 | Bleile et al. | |
| 2012/0191427 | A1 | 7/2012 | Cianflone et al. | |
| 2013/0255648 | A1 * | 10/2013 | Yamamoto | F02B 39/16 123/559.1 |
| 2014/0230530 | A1 * | 8/2014 | Fontvieille | F02D 41/221 73/114.13 |
| 2015/0110650 | A1 | 4/2015 | Christmann | |
| 2016/0103032 | A1 * | 4/2016 | Nakano | F02D 41/22 73/112.01 |

* cited by examiner

CAC
CONTROLLER
AIR IN
EXHAUST OUT
C
T
28
84
10
44
46
82
12
32
34
36
22
20
18
72
74
66
24
64
86
41
92
40
65
25
26
94
88
68
42
43
70
27
96
52
29
30
50
21
14
45
16

TURBOCHARGER SPEED ANOMALY DETECTION

TECHNICAL FIELD

The disclosure generally relates to an internal combustion engine that is turbocharged and more particularly to a process and a system for detecting anomalies in turbocharger speed.

BACKGROUND

Internal combustion engines are used to provide a power source for vehicles, generator sets, heavy mechanical equipment, large tractors, on-road vehicles, off-road vehicles, and the like. An internal combustion engine, such as a diesel engine, a gasoline engine, and a gaseous fuel powered engine, is supplied with a mixture of air and fuel for combustion within combustions chambers of the engine to generate mechanical power output.

Under certain operating conditions, a turbocharger in an internal combustion engine improves overall engine efficiency and provides increased power, particularly during vehicle acceleration. In operation, radial inflow turbines are driven by engine exhaust gas. The turbine then drives a radial compressor that increases the pressure of intake air provided to the engine. The increased density of the intake air enhances the combustion process, resulting in a higher output of power.

Turbochargers typically operate at high speeds and high temperatures. For example, in some engines, the turbocharger shaft may rotate up to 170,000 rpm and the temperature of the compressed air leaving the turbocharger may reach up to 200° C. As a result of these extreme operating conditions, turbochargers are often susceptible to excessive damage and in some cases, even failure. Some common turbocharger problems include damaged turbine blades, air or gas leakage, a restriction or blockage in the air injection, journal bearing failure, oil degradation, contaminated oil or insufficient oil supply.

When the turbocharger is not functioning properly, turbine efficiency may be lowered, the engine may operate unstably, and in extreme cases, engine damage may result. Additionally, some turbocharger problems may cause unsafe operating conditions of the engine or even lead to complete engine failure. Engine designers have therefore been particularly interested in closely monitoring the operation of the turbocharger in an effort to identify problems before they impact engine performance. Early detection of turbocharger problems will provide an opportunity to make operational adjustments, expedite necessary repair or replacement of the turbocharger prior to failure. Early detection of turbocharger problems will also ensure the best engine performance and prolong the service of both the turbocharger and the engine.

Different strategies have been employed to address the issue of detecting a turbocharger problem. The most common strategy used involves monitoring the turbocharger shaft speed to detect an anomaly in the operation of the turbocharger. Direct speed measurement of the turbocharger shaft, however, is difficult. Therefore, in some instances it is more common to use another engine operating parameter that is more easily measured as a surrogate for direct speed measurement. For example, German Patent Publication No. DE 102012212555 A1 describes determining rotation speed data that indicates a rotation speed of a compressor of a high-pressure side charging device (i.e., turbocharger) and detecting a fault in one of the charging devices depending on a threshold comparison of the speed indication. The charge pressure over a specified pressure lead on the output side of the compressor of the high-pressure side charging device is used to determine the turbocharger performance. The error in one of the charging devices is detected corresponding to the charge pressure specified.

However, such approaches require additional equipment and do not fully address the difficulties with monitoring turbochargers of existing engine systems using readily available field data. Thus, there presently exists a need in the art for a more reliable system and process for detecting anomalies in turbocharger speed using available field data such that faulty turbochargers may be identified and repaired or replaced prior to failure. Accordingly, the disclosed system and process is directed at overcoming one or more of these disadvantages in currently available turbocharged engine systems.

SUMMARY

In accordance with one aspect of the disclosure, a machine is disclosed. The machine includes a power source having an intake manifold for supplying the power source with air, a plurality of turbochargers, each turbocharger including an air inlet passageway to receive air, a plurality of pressure sensors arranged within the inlet passageway configured to monitor the differential pressure across the air inlet passageway, a compressor configured to pressurize air, an air outlet passageway to direct pressurized air from the compressor to the intake manifold, and an exhaust turbine operably driven by exhaust gas from the power source and coupled to the compressor by a turbine shaft, and a controller in communication with the plurality of pressure sensors, wherein the controller is configured to detect an anomaly in turbocharger speed for one or more of the turbochargers based on at least the differential pressure across the air inlet passageway for the one or more turbochargers.

In accordance with another aspect of the disclosure, a process for monitoring turbocharger operation in a machine is disclosed. The machine includes a power source having an intake manifold for supplying the power source with air and a plurality of turbochargers. Each turbocharger includes an air inlet passageway to receive air, a plurality of pressure sensors arranged within the inlet passageway configured to monitor the differential pressure across the air inlet passageway, a compressor configured to pressurize air, an air outlet passageway to direct pressurized air from the compressor to the intake manifold, and an exhaust turbine operably driven by exhaust gas from the power source and coupled to the compressor by a turbine shaft. The process includes monitoring the differential pressure across the air inlet passageway for each turbocharger, comparing the differential pressure across the air inlet passageway for each turbocharger, and indicating an anomaly in turbocharger speed when the differential pressure across the air inlet passageway for one turbocharger exceeds the differential pressure across the air inlet passageway for another turbocharger by a threshold amount.

In accordance with another aspect of the disclosure, a process for monitoring turbocharger operation in a machine is disclosed. The machine includes an engine having an intake manifold for supplying the engine with air, a first pair of turbochargers connected in parallel to a second pair of turbochargers, each pair including a first turbocharger and a second turbocharger connected in parallel. Each turbocharger includes an air inlet passageway to receive air, a plurality of pressure sensors arranged within the air inlet passageway configured to monitor the differential pressure across the air inlet passageway, a compressor configured to pressurize air, an air outlet passageway to direct pressurized air from the compressor to the intake manifold, and an exhaust turbine operably driven by exhaust gas from the engine and coupled to the compressor by a turbine shaft. The process includes monitoring the differential pressure across the air inlet passageway for each turbocharger in each pair of turbochargers, comparing the differential pressure across the air inlet passageway for each turbocharger in each pair of turbochargers to the differential pressure across the air inlet passageway for each of the other turbochargers in the first and second pair of turbochargers, and indicating an anomaly in turbocharger speed when the differential pressure across the air inlet passageway for one turbocharger exceeds the differential pressure across the air inlet passageway for another turbocharger by a threshold amount. The process further includes performing maintenance on the engine if the difference in differential pressure across the air inlet passageway between the first turbocharger of the first pair and either the first or the second turbochargers of the second pair exceeds a threshold amount or the difference in differential pressure across the air inlet passageway between the second turbocharger of the first pair and either the first or the second turbochargers of the second pair exceeds the threshold amount.

BRIEF DESCRIPTION OF THE DRAWINGS

The above-mentioned and other features and advantages of this disclosure, and the manner of attaining them, will become apparent and be better understood by reference to the following description of one aspect of the disclosure in conjunction with the accompanying drawings, wherein.

DETAILED DESCRIPTION

Figure 1:
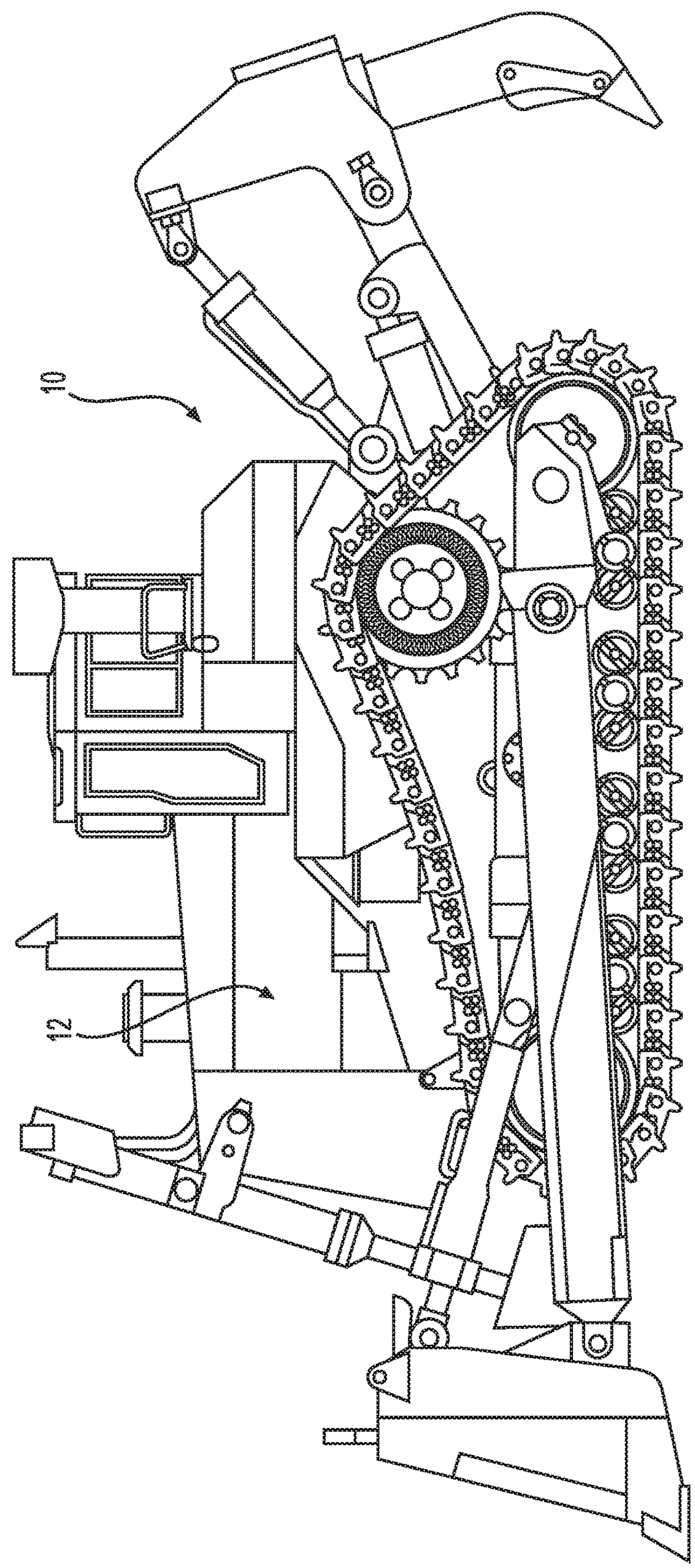
FIG. 1 is a schematic illustration of a machine according to an aspect of the disclosure.

FIG. 1 provides a diagrammatic perspective view of a work machine 10 according to an aspect of the present disclosure. The work machine 10 may be a mining truck as shown or any other type of machine, including on-highway machines, off-highway machines, earth moving equipment, generators, aerospace machines, locomotive machines, marine machines, pumps, stationary equipment, other types of machinery or other engine powered applications. The work machine 10 may also be any type of machine that includes one or more electric motors. The work machine 10 includes a power source 12 configured to provide a power output for powering various operations of the work machine 10. The power source 12 may be any type of engine, including internal combustion engine that operates using diesel fuel, gasoline, natural gas, propane or other type of fuel.

Figure 2:
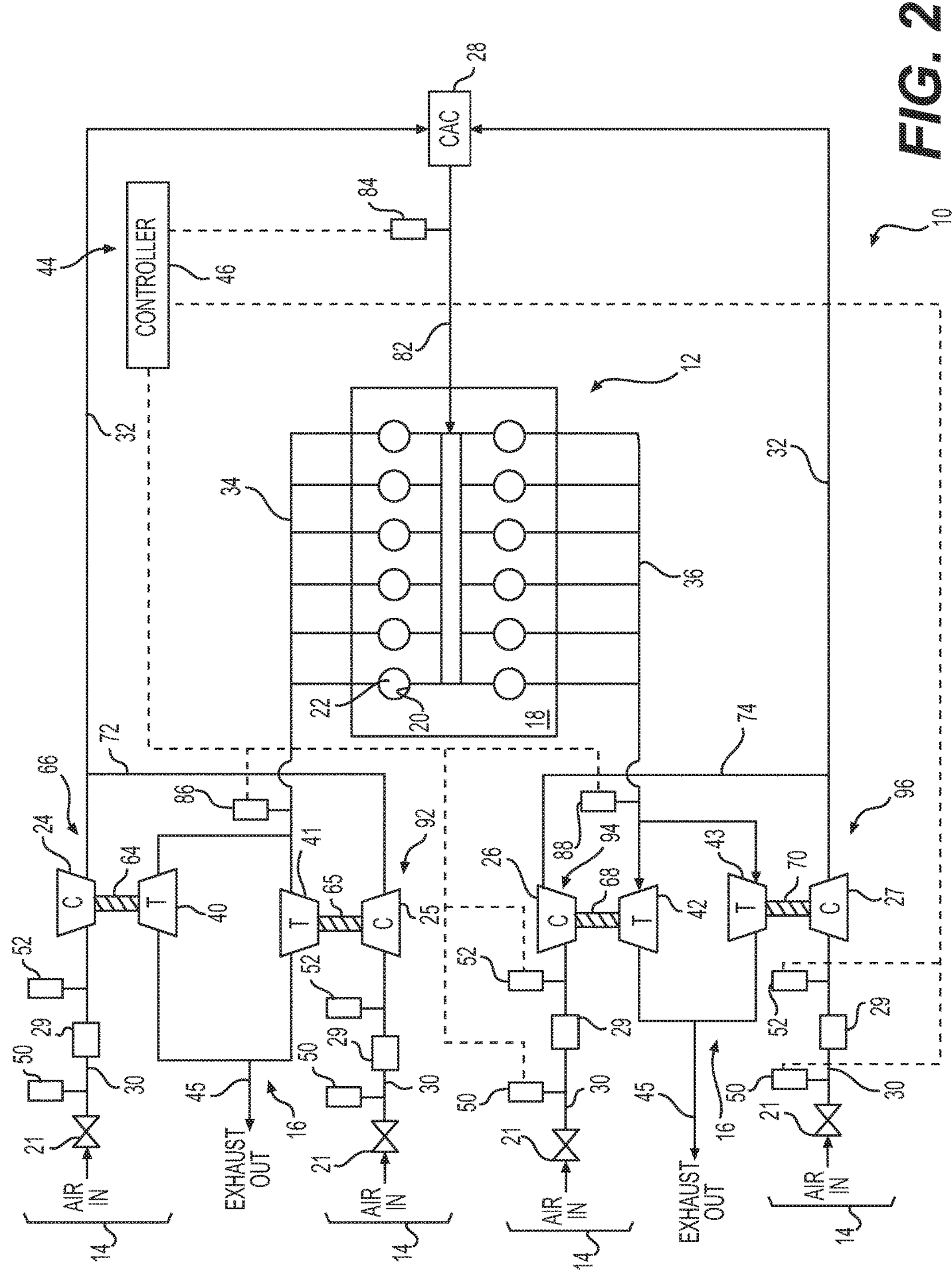
FIG. 2 is a schematic illustration of a turbocharged internal combustion engine, according to an aspect of the disclosure.

Referring to FIG. 2, the work machine 10 having the power source 12 may include an air induction system 14 and an exhaust system 16. The power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. The cylinder 20, the piston, and the cylinder head may form a combustion chamber 22. In the illustrated aspect, the power source 12 includes twelve such combustion chambers 22 aligned in two rows or banks arranged in a V-configuration. However, it is contemplated that the power source 12 may include a greater or lesser number of combustion chambers 22, if desired. It is also contemplated that the power source 12 may be arranged in an in-line configuration.

The air induction system 14 may include components configured to introduce air into the power source 12. For example, the air induction system 14 may include at least one compressor, and an air cooler 28, and these components may be fluidly connected to an intake manifold 82 of the power source 12. As shown in FIG. 2, in certain aspects of the disclosure, the intake manifold 82 may be a common intake manifold 82 fluidly connected to each of the combustion chambers 22. Alternatively, in certain aspects, there may be more than one intake manifold 82. The air induction system 14 may further include an induction valve 21 connected upstream of each compressor 24, 25, 26, 27 via the air inlet passageway 30 configured to regulate the flow of ambient air to the power source 12.

Ambient air may contain dirt, debris, dust particles, salt and other contaminants may damage the compressor 24, 25, 26, 27 and the turbine blades (not shown). Therefore, the air induction system 14 may include an air filter 29 to filter the ambient air prior to compression. In one aspect of the disclosure, there is a dedicated air filter 29 for each compressor 24, 25, 26, 27. As shown in FIG. 2, there is an air filter 29 arranged upstream of each compressor 24, 25, 26, 27. In some aspects of the disclosure, each air filter 29 has the same porosity. When the power source 12 is in use, equal amounts of air are pulled through each air filter 29. As air is pulled through the air filters 29, any particles are collected by the air filters 29. After prolonged use these particles will tend to restrict the air filters 29. In the event any one of the air filters 29 becomes blocked or restricted, the air filter must be cleaned or replaced to ensure that adequate air flow passes through the air filter 29 to the power source 12.

In some aspects of the disclosure, the air filters 29 may contribute to variations in the performance of the turbochargers 66, 92, 94, 96. This may occur in the event that one of the air filters 29 becomes blocked or restricted during its use compared to the other air filters 29. This may be a result of the operating conditions of the power source 12, the air flow through the air filter 29, and the porosity and size of the air filter 29. For example, if one of the air filters 29 becomes more restricted than the other three air filters 29, then the pressure across the air filter 29 will increase and the speed of the turbocharger 66, 92, 94, 96 associated with the restricted air filter 29 will increase. If the speed of one of the turbochargers 66, 92, 94, 96 suddenly decreases relative to the speed of the neighboring turbochargers 66, 92, 94, 96, then the differential pressure will decrease. Corrective or remedial action for each of these scenarios are addressed below.

Each compressor 24, 25, 26, 27 may embody a fixed geometry compressor, a variable geometry compressor, or any other type of compressor configured to receive air from an induction valve 21 and compress the air to a predetermined pressure level before it enters the power source 12. In one aspect of the disclosure, the air induction system 14 includes four substantially identical compressors (a first compressor 24, a second compressor 25, a third compressor 26 and a fourth compressor 27) disposed in a parallel relationship and connected to the power source 12 via a fluid passageway 32. In one aspect, the fluid passageway 32 may extend from each of the compressors 24, 25, 26, 27 to the intake manifold 82. In another aspect, at least one of the compressors 24, 25, 26, 27 may be fluidly connected to the fluid passageway 32 via one or more separate passages 72, 74. As shown in FIG. 2, the first compressor 24 and second compressor 25 are fluidly connected to the fluid passageway 32 via passage 72. The third compressor 26 and fourth compressor 27 are fluidly connected to the fluid passageway 32 via passage 74. One or more of the compressors 24, 25, 26, 27 may also be fluidly connected to an inlet passageway 30 through which inlet air may be drawn into the air induction system 14.

An air cooler 28 may embody an air-to-air heat exchanger, an air-to-liquid heat exchanger, or a combination of both, and be configured to facilitate the transfer of thermal energy to or from the compressed air directed into the power source 12. The air cooler 28 may be disposed within the fluid passageway 32, between the power source 12 and the compressors 24, 25, 26, 27.

Exhaust produced during the combustion process within the combustion chambers 22 may exit the power source 12 via either a first exhaust manifold 34 or a second exhaust manifold 36. For example, the first six combustion chambers 22 (the upper bank) of the power source 12 may be fluidly connected to the first exhaust manifold 34. The final six combustion chambers 22 (the lower bank) of the power source 12 may be fluidly connected to the second exhaust manifold 36. Each of the first exhaust manifold 34 and the second exhaust manifold 36 may be fluidly connected to a turbine. The turbine may receive the exhaust from the first and second exhaust manifolds 34, 36.

In one aspect of the disclosure, at least two turbines may be fluidly connected to the first and second manifolds 34, 36. As shown in FIG. 2, the exhaust system 16 may include four substantially identical turbines (a first turbine 40, a second turbine 41, a third turbine 42 and fourth turbine 43) disposed in a parallel relationship and connected to the first and second manifolds 34, 36. The first exhaust manifold may be fluidly connected to a first turbine and a second turbine as shown in FIG. 2. The second exhaust manifold may be fluidly connected to a third turbine 42 and a fourth turbine 43. In other aspects, the exhaust system 16 may include greater than or less than four turbines 40, 41, 42, 43. One or more of the turbines 40, 41, 42, 43 may be fluidly connected to an outlet passageway 45 through which exhaust may be released to the atmosphere or to other exhaust treatment devices (not shown) of the exhaust system 16.

The first turbine 40 may be a single volute turbine configured to receive exhaust from the first exhaust manifold 34 and drive one or more of the compressors 24, 25, 26, 27. For example, the first turbine 40 may be directly and mechanically connected to the first compressor 24 by way of a shaft 64 to form a first turbocharger 66. As the hot exhaust gases exiting the power source 12 move through the first turbine 40 and expand against blades (not shown) therein, the first turbine 40 may rotate and drive the connected first compressor 24 to pressurize air directed into the power source 12. In one embodiment, the first turbine 40 may be a variable geometry turbine having an adjustable nozzle ring or adjustable vane members, if desired.

The second turbine 41 may also be connected to one of the compressors 24, 25, 26, 27 to form a fixed or variable geometry turbocharger 92. For example, the second turbine 41 may be directly and mechanically connected to second compressor 25 by way of a shaft 65 to form a second turbocharger 92. In the arrangement shown in FIG. 2, the second turbine 41 may be a single volute turbine situated to receive exhaust from the first and/or second exhaust manifolds 34, 36. As the hot exhaust gases exiting the power source 12 move through the second turbine 41 and expand against blades (not shown) therein, second turbine 41 may rotate and drive the connected second compressor 25 to pressurize air directed into the power source 12.

The third turbine 42 may similarly be connected to one of the compressors 24, 25, 26, 27 to form a third fixed or variable geometry turbocharger 94. For example, the third turbine 42 may be directly and mechanically connected to the third compressor 26 by way of a shaft 68 to form a third turbocharger 94. In the arrangement shown in FIG. 2, the third turbine 42 may be a single volute turbine situated to receive exhaust from the first and/or second exhaust manifolds 34, 36. As the hot exhaust gases exiting the power source 12 move through the third turbine 42 and expand against blades (not shown) therein, the third turbine 42 may rotate and drive the third compressor 26 to pressurize air directed into the power source 12.

The fourth turbine 43 may similarly be connected to one of the compressors 24, 25, 26, 27 to form a fourth fixed or variable geometry turbocharger 96. For example, the fourth turbine 43 may be directly and mechanically connected to the fourth compressor 27 by way of a shaft 70 to form the fourth turbocharger 96. In the arrangement shown in FIG. 2, the fourth turbine 43 may be a single volute turbine situated to receive exhaust from the first and/or second exhaust manifolds 34, 36. As the hot exhaust gases exiting the power source 12 move through the fourth turbine 43 and expand against the blades (not shown) therein, the fourth turbine 43 may rotate and drive the fourth compressor 27 to pressurize air directed into the power source 12.

The machine 10 may include a control system 44 to regulate the operation of the power source 12 using a controller 46. The control system 44 may include components that function to detect an anomaly in any of the turbochargers 66, 92, 94, 96. The control system 44 may also function to determine the underlying cause of the anomaly prior to turbocharger failure.

In one aspect of the disclosure, an anomaly in turbocharger speed may be caused by a malfunction in the air induction system 14. A malfunction in the air induction system 14 may result in an insufficient supply of air to the intake manifold 82 causing low air pressure and excessive turbocharger speeds. For example, the intake manifold 82 may have a crack and be leaking or it may have become blocked or clogged. A blocked or leaking intake manifold 82 will affect the flow rate of air entering the power source 12, which will in turn affect turbocharger speed and the performance of the power source 12.

In another aspect of the disclosure, the turbocharger anomaly may be caused by a faulty turbocharger 66, 92, 94, 96. There are several common causes of faulty turbochargers 66, 92, 94, 96. There may be for example, a shaft 64, 65, 68, 70 or bearing (not shown) failure caused by excessive wear or lack of lubrication. The blades of one of the compressors 24, 25, 26, 27 or the turbines 40, 41, 42, 43 may also be damaged from contamination or foreign objects entering the housing of the turbine 40, 41, 42, 43 or the compressor 24, 25, 26, 27.

The controller 46 may communicate with the pressure sensors 50 associated with the air inlet passageway 30 for each compressor 24, 25, 26, 27. The pressure sensors 50 monitor the differential pressure (Δp) across the air inlet passageway 30. In one aspect of the disclosure, the differential pressure across the air filter 29 arranged within the air inlet passageway 30 for each compressor 24, 25, 26, 27 is monitored. For example, as shown in FIG. 2, there may be a pressure sensor 50 located at the inlet of each air filter 29 and at the outlet of each air filter 29.

In one aspect of the disclosure, the air flow rate across the air inlet passageway 30 is equal for each compressor 24, 25, 26, 27. If the turbochargers 66, 92, 94, 96 are of equal size, the differential pressure across each air inlet passageway 30 should be approximately equal, within any measurement of uncertainty. It is contemplated that the differential pressure across the air inlet passageway 30 or the air filter 29 is a function of the speed of the shaft 64, 65, 68, 70 such that any difference in differential pressure values indicates the existence of a turbocharger anomaly within a defined threshold amount. If the power source 12 is operating properly, then the speed of the turbochargers 66, 92, 94, 96 should be equal within a defined threshold amount. In some aspects, the differential pressure across the air inlet passageway 30 may be a proxy for measuring turbocharger speed or the speed of the shaft 64, 65, 68, 70. For example, an expected or desired rpm for the shaft 64, 65, 68, 70 may directly correspond to a certain differential pressure value. Therefore, an anomaly in the differential pressure across the air inlet passageway 30 or the air filter 29 corresponds to an anomaly in turbocharger speed. As discussed above, this relationship may be especially useful for certain power sources 12 in the absence of reliable shaft speed information or shaft speed sensors.

In some aspects, the control system 44 may detect an anomaly in turbocharger speed based on differences between the differential pressure across the various air inlet passageways 30 or the air filters 29. In some aspects, the control system 44 may detect an anomaly in turbocharger speed based on differences in the differential pressures across the various air inlet passageways 30 or air filters 29. For example, if the differential pressure across one air filter 29 is higher than the differential pressures across the other air filters 29, then the higher differential pressure air filter 29 may be restricted and should be cleaned or replaced. If the differential pressure across one air filter 29 is lower than the differential pressure across the other air filters 29 then the turbocharger 66, 92, 94, 96 associated with the lower differential pressure air filter 29 should be checked for mechanical damage.

In one aspect of the disclosure, the controller 46 may indicate an anomaly in turbocharger speed when the difference in differential pressure across the air filters 29 is above a threshold difference. Upon indicating the turbocharger anomaly, the controller 46 may check the differential pressure values of each air filter 29 to determine whether or not the turbocharger anomaly is based on an air filter 29 having a differential pressure that is either too high or too low in comparison with the other air filters 29.

If the controller 46 determines that a particular air filter 29 is operating at a differential pressure that is higher than the differential pressures of the other air filters 29 in the machine 10, the controller 46 may generate an air filter maintenance message to the operator of the machine. The operator of the machine 10 may then clean or replace the air filter(s) as needed in response to the air filter maintenance message.

If the controller 46 determines that a particular air filter 29 is operating at a differential pressure that is lower than the differential pressures of the other air filters 29, the controller 46 may generate a turbocharger maintenance message to the operator of the machine. In response to the turbocharger maintenance message, the operator may take the work machine 10 to a repair facility where the turbocharger(s) 66, 92, 94, 96 may be checked for damage. The threshold difference may be based on at least an acceptable amount of difference between the differential pressure values. The threshold difference, for example, may account for a certain amount of measurement error from the pressure sensors 50. If the difference does not exceed the threshold difference, then there is no anomaly in turbocharger speed detected and each turbocharger 66, 92, 94, 96 is considered to be operating at the same speed.

In some aspects, the control system 44 may generate a warning message in response to detecting an anomaly in turbocharger speed. The warning message may be visually displayed to alert the operator of the work machine 10 that an anomaly in turbocharger speed has been detected. The warning message may also be audible. The control system 44 may continue to generate the warning message while the difference in differential pressure values exceeding the threshold difference is maintained.

Upon receiving the warning message, the operator may adjust operation of the machine 10, for example, by reducing the speed or the load to avoid any damage to the power source 12. In some aspects of the disclosure, the power source 12 may be disabled as a protective measure if the turbocharger speed anomaly is indicated a predetermined number of times within a specific period of time or has occurred continuously over a predetermined period of time.

In one aspect, the power source 12 may be disabled in the event there is an anomaly detected between the turbochargers 66, 92, 94, 96 within the same bank. For example, for the power source 12 shown in FIG. 2, the first and second turbochargers 66, 92 are arranged within an upper bank associated with the first six combustion chambers 22. The third and fourth turbochargers 94, 96 are arranged within a lower bank associated with the last six combustion chambers 22. Differences in speed between the turbochargers 66, 92, 94, 96 located within the same bank are indicative of more immediate failure of the turbocharger 66, 92, 94, 96 and the power source 12. Therefore, if the difference in the differential pressure across the air filter 29 for the first compressor 24 and the second compressor 25 is above the threshold difference, then the control system 44 may disable the power source 12 in addition to generating a warning message that an anomaly has occurred. Similarly, if the differential pressure across the air filter 29 for the third compressor 24 and the fourth compressor 25 is above the threshold difference, then the control system 44 may disable the power source 12 and generate a warning message. Detection of a turbocharger speed anomaly in other aspects, however, generally serves to provide information to the operator that a problem has been detected without taking any further action until the cause of the problem has been determined.

After a turbocharger speed anomaly has been detected, the control system 44 may perform diagnostic tests to determine the cause of the anomaly and to recommend the appropriate corrective action to prevent turbocharger failure. The diagnostic tests discussed in more detail below evaluate certain operating parameters of the power source 12. For example, in one aspect, the control system 44 may evaluate the air pressure of the intake manifold 82 in response to a turbocharger anomaly. In another aspect, the control system 44 may evaluate the temperature of the exhaust gas in response to a turbocharger anomaly.

As shown in FIG. 2, the controller 46 may communicate with an intake air pressure sensor 84 associated with the intake manifold 82 to monitor the air pressure of the intake manifold 82 of the power source 12. If the controller 46 has detected a turbocharger speed anomaly and the air pressure of the intake manifold 82 is below a threshold pressure, then the controller 46 indicates an engine air system error. Otherwise, the controller 46 indicates a turbocharger error. The threshold pressure represents the minimum amount of air pressure required at the intake manifold 82 to properly operate the power source 12.

In the event of either a turbocharger error or an engine air system error, the controller 46 may generate an error message that may be communicated as an onboard visual or audible message to the operator of the machine 10. An engine air system error indicates that there is a problem with the air induction system 14 that is causing the anomaly in turbocharger speed. A turbocharger error indicates that the turbocharger anomaly is caused by a faulty turbocharger 66, 92, 94, 96. The controller 46 may adjust operation of the power source 12 in response to the turbocharger error.

The controller 46 may also communicate with the temperature sensors 86, 88 associated with the first and second exhaust manifolds 34, 36 respectively to monitor the temperature of the exhaust gas. As shown in FIG. 2, the temperature sensor 86 is arranged within the first exhaust manifold 34 upstream of the turbines 40, 41 and may communicate with the controller 46. The temperature sensor 88 is arranged within the second manifold 36 upstream of the turbines 42, 43 and may communicate with the controller 46.

The exhaust gas temperature sensed by the temperature sensors 86, 88 should remain below a maximum temperature. The maximum temperature represents a predetermined temperature limit or the highest temperature that the exhaust gas can reach while the turbochargers 66, 92, 94, 96 and the power source 12 continue to operate properly. Exhaust gas temperatures that exceed the maximum temperature may cause damage to the power source 12. A rise in the exhaust gas beyond the maximum temperature is indicative of an abnormality in the operation of the turbocharger 66, 92, 94, 96 and a faulty turbocharger 66, 92, 94, 96. If the controller 46 has detected a turbocharger speed anomaly and a temperature sensor 86, 88 senses an exhaust gas temperature greater than the maximum temperature, the controller 46 indicates a turbocharger error. Otherwise, the controller 46 indicates an engine air system error.

Upon receiving an engine air system error message, the controller 46 may respond by adjusting the position of the induction valves 21 to increase the flow rate and pressure of air passing through the intake manifold 82. Upon receiving a turbocharger 66, 92, 94, 96 error message, the operator may be instructed to take certain maintenance action for the faulty turbocharger 66, 92, 94, 96. The operator may also be advised how to operate the power source 12 prior to scheduling the maintenance action. In some cases, the operator may be able to extend the period of operation for the work machine 10 prior to the maintenance action by adjusting certain engine parameters, i.e. the fuel ratio.

Figure 3:
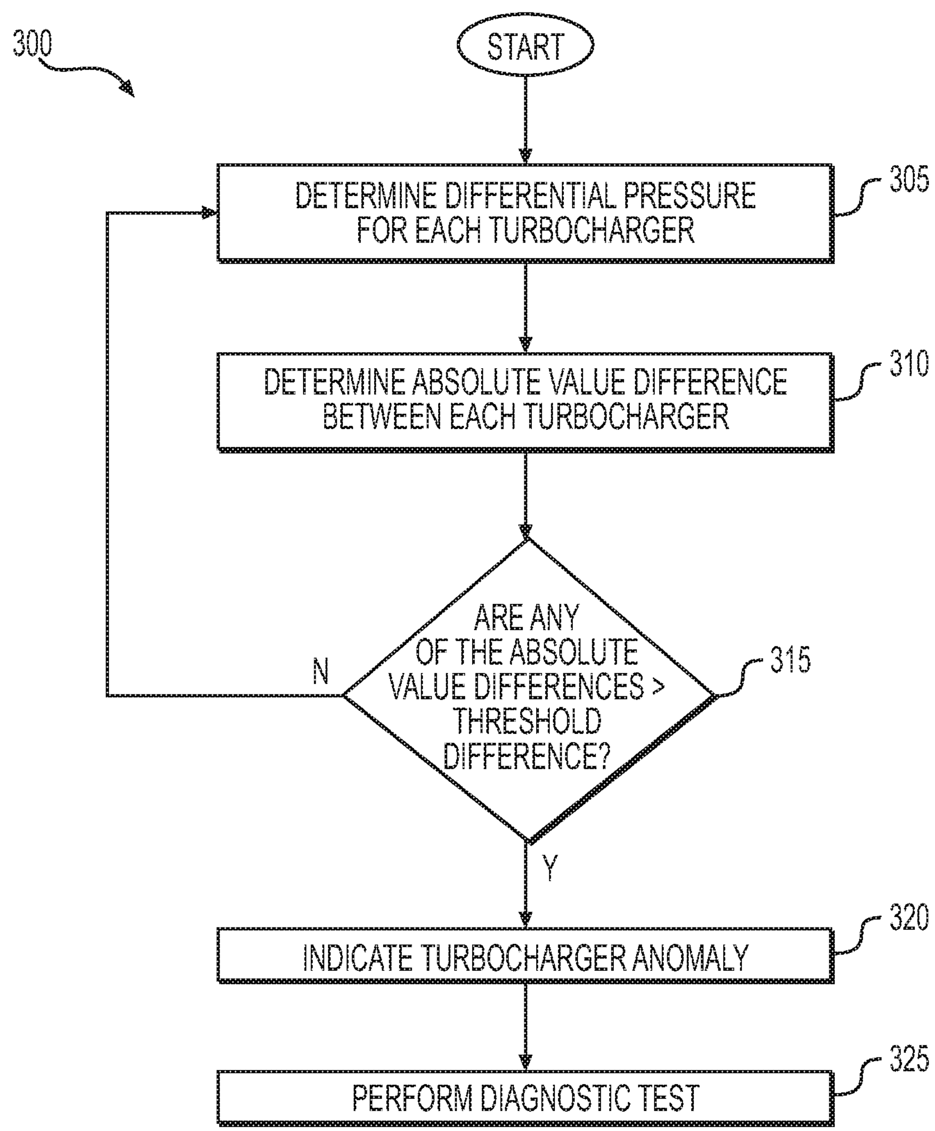
FIG. 3 is a flow chart of a process for monitoring operation of a turbocharger, according to an aspect of the disclosure, including indicating an anomaly in turbocharger speed.

FIG. 3 shows a flow diagram of steps that may be performed in a process 300 for monitoring turbocharger 66, 92, 94, 96 speed in a work machine 10 according to one aspect of the disclosure. The process 300 illustrated is for the work machine 10 shown in FIG. 2 having turbochargers 66, 92, 94, 96. The process 300 may be performed by the control system 44. Alternatively, the process 300 may be performed by an external computer system.

As shown, the process 300 first determines the differential pressure (Δp) across each air filter 29 (step 305). For the power source 12 shown in FIG. 2, there is a differential pressure value Δp1 associated with the air filter 29 for the first turbocharger 66, Δp2 for the second turbocharger 92, Δp3 for the third turbocharger 94 and Δp4 for the fourth turbocharger 96.

Differential pressure values Δp1, Δp2, Δp3, Δp4 represent the difference between a first pressure $p_1$ and a second pressure $p_2$ ($\Delta p = p_1 - p_2$). The pressure sensors 50, 52 located at the inlet and the outlet of each air filter 29, respectively, generate signals based on the pressure sensed at the air filter 29 inlet $p_1$ and the pressure at the air filter 29 outlet $p_2$. The controller 46 receives pressure signals from the pressure sensors 50, 52 and processes the information to determine the differential pressure values Δp1, Δp2, Δp3, Δp4.

In step 310, the differential pressure values obtained in step 305 are compared. As part of this comparison, the absolute value of the difference (the absolute difference) in differential pressure between each turbocharger 66, 92, 94, 96 is calculated. In one aspect of the disclosure, the flow rate of air through each air inlet passageway 30 should be equal. Therefore, if the power source 12 is operating properly, the differential pressure values from step 305 should be approximately equal (Δp1=Δp2=Δp3=Δp4) and the absolute value of the difference in these differential pressure values should be minimal. For the power source 12 shown in FIG. 2, step 310 includes determining the following absolute difference values: $P_{abs}-\Delta p1-\Delta p2$; $P_{abs}=\Delta p1-\Delta p3$; $P_{abs}=\Delta p1-\Delta p4$; $P_{abs}=\Delta p2-\Delta p3$; $P_{abs}=\Delta p2-\Delta p4$; $P_{abs}=\Delta p3-\Delta p4$.

In step 315, the absolute difference values obtained in step 310 are compared to the threshold difference. If the absolute difference exceeds the threshold difference, then the process 300 proceeds to step 320. Otherwise, the turbochargers 66, 92, 94, 96 are considered to be functioning properly and the process 300 returns to step 305 where the determination of the differential pressure across the air filter 29 is repeated. In one aspect of the disclosure, the differential pressure across the air inlet passageway 30 or air filter 29 is continuously monitored.

In step 320, the controller 46 indicates that there is an anomaly in turbocharger speed. The indication of the anomaly in turbocharger speed is triggered by the determination that the absolute difference previously calculated in step 315 exceeds the threshold difference. The indication of the turbocharger speed anomaly may include a warning message that is generated to alert the operator of the machine 10 that an anomaly in turbocharger speed has been detected. The indication of the anomaly in turbocharger speed may be a visual or an audible warning message. The controller 46 may continue to indicate the anomaly in turbocharger speed while the absolute difference exceeding the threshold difference is maintained. After the anomaly in turbocharger speed has been indicated (step 320), the process 300 will proceed to diagnose the problem by performing a diagnostic test (step 325).

Figure 4:
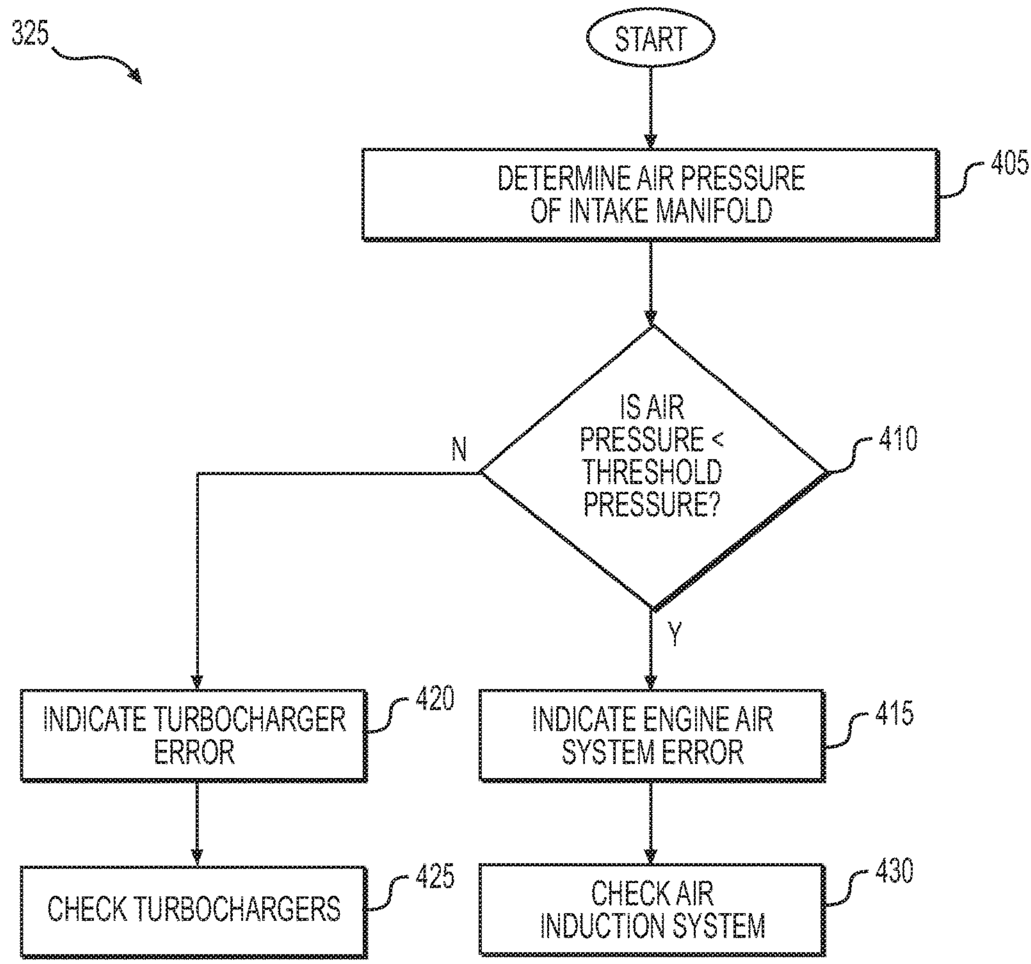
FIG. 4 is a flow chart of a process for monitoring operation of a turbocharger, according to an aspect of the disclosure, including performing a diagnostic test.

Referring to FIG. 4, there is shown a detailed flow diagram of the steps for performing the diagnostic test (step 325) depicted in FIG. 3 according to one aspect of the disclosure. The first step 405 in the diagnostic test 325 is to determine the air pressure of the intake manifold 82. An intake air pressure sensor 84 senses the pressure in the intake manifold 82. The measured air pressure of the intake manifold 82 is then transmitted to the controller 46. The controller 46 receives the measured pressure of the intake manifold 82.

In step 410, the controller 46 compares the measured air pressure of the intake manifold 82 from step 405 to a threshold pressure. If the measured air pressure of the intake manifold 82 is less than the threshold pressure, then the diagnostic test 325 proceeds to step 415.

In step 415, the controller 46 indicates an engine air system error. The controller 46 may generate an engine air system error message that may be communicated as an onboard visual or audible message to the operator of the machine 10 and then proceeds to step 430. The engine air system error indicates that there is a problem with the engine air system that is causing the anomaly in turbocharger speed. Engine air system problems may include but are not limited to leaks in the ATAAC, leaks in the exhaust or leaks in the connecting piping that is venting the compressed air instead of feeding it to the engine.

Figure 5:
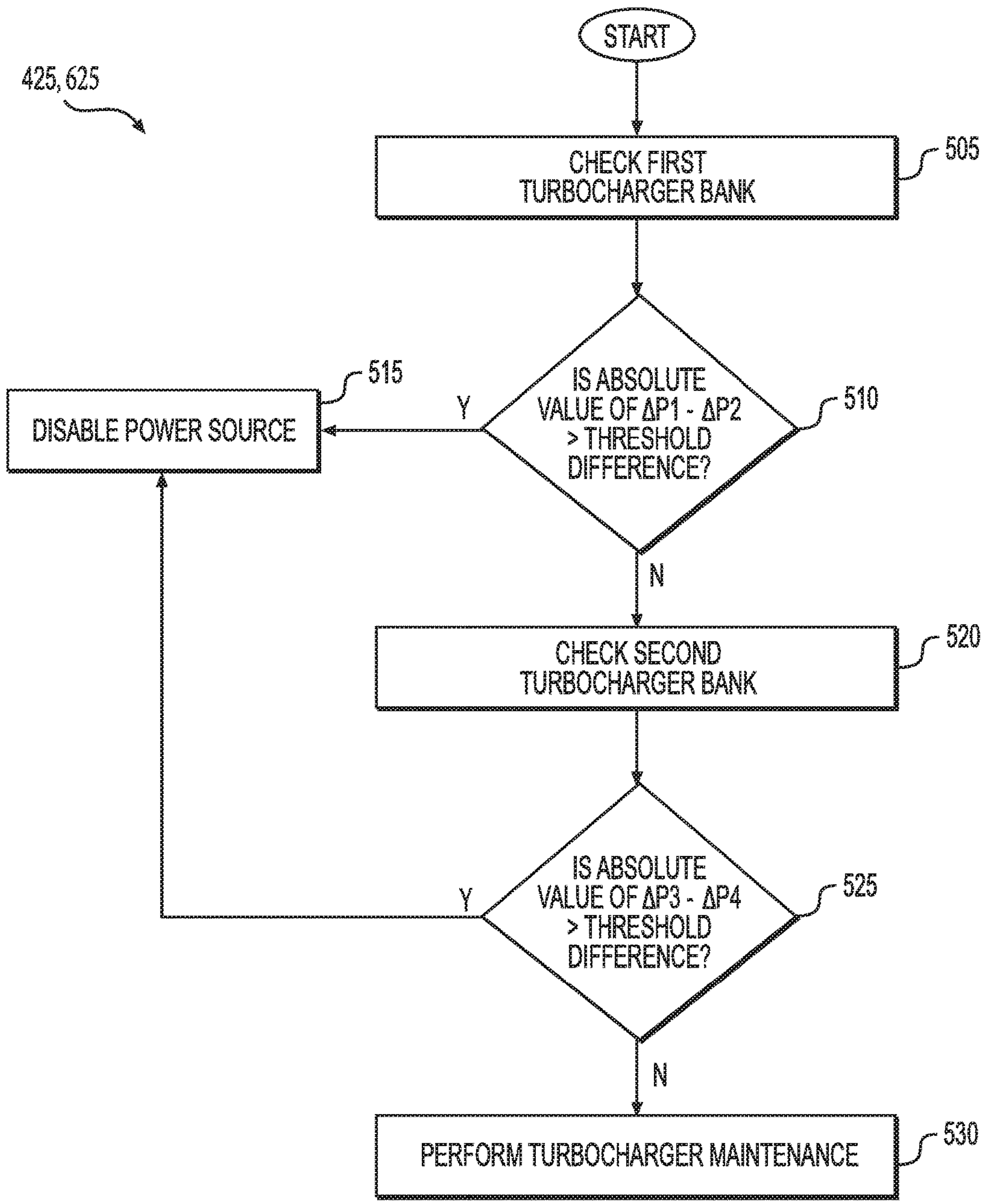
FIG. 5 is a flow chart of a process for detecting a turbocharger problem, according to an aspect of the disclosure.

If the measured air pressure is greater than the threshold pressure, then the diagnostic test 325 proceeds to step 420. In step 420, the controller 46 indicates a turbocharger 66, 92, 94, 96 error. Because the measured pressure of the intake manifold 82 is above the threshold pressure, it is determined that there is an adequate amount of air flow at the intake manifold 82 and the anomaly in turbocharger 66, 92, 94, 96 speed must be caused by a faulty turbocharger 66, 92, 94, 96 instead of a problem with the engine air system. The controller 46 may generate a turbocharger 66, 92, 94, 96 error message that may be communicated as an onboard visual or audible message to the operator of the work machine 10. After step 420, the diagnostic test 325 proceeds to step 425. In step 425, the controller 46 performs a turbocharger 66, 92, 94, 96 check to identify whether or not the anomaly is between turbochargers 66, 92, 94, 96 within the same bank. The turbocharger check (step 425 and step 625) is shown in FIG. 5 according to one aspect of the disclosure.

Figure 6:
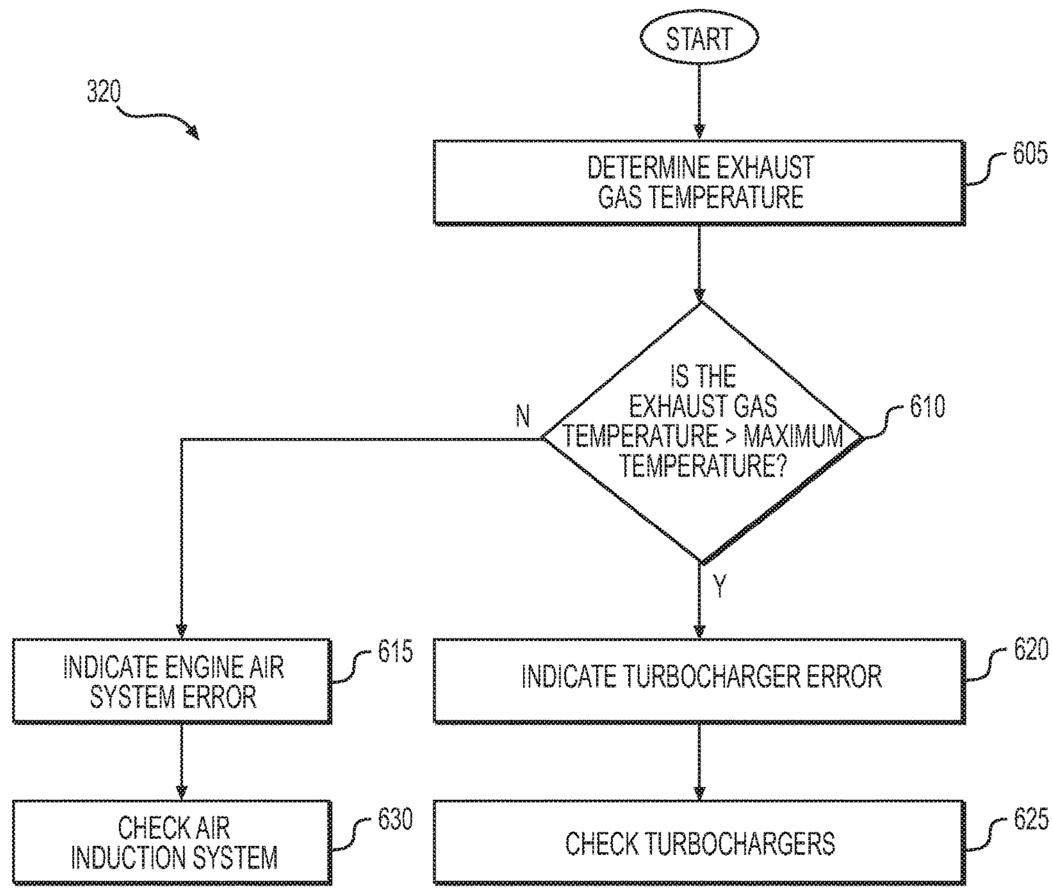
FIG. 6 is a flow chart of a process for process for monitoring operation of a turbocharger, according to an aspect of the disclosure, including performing a diagnostic test.

Referring to FIG. 6, there is shown an alternative diagnostic test 425 according to another aspect of the disclosure. The first step 605 in the diagnostic test 425 shown in FIG. 6 is to determine the exhaust manifold temperature. The temperature of exhaust gas is measured at the exhaust manifolds 34, 36. The temperature sensors 86, 88 arranged within the exhaust manifolds 34, 36 is used in step 505 for this purpose. The temperature sensor 86, 88 senses the temperature of the exhaust gas upstream of the turbine and downstream of the engine 12. The measured exhaust manifold temperature is then transmitted to the controller 44. The controller 44 receives the measured temperature of the exhaust gas.

In step 610, the controller 44 compares the measured temperature of the exhaust gas to a maximum temperature. The controller 46 in step 610 determines whether the measured exhaust gas temperature is greater than the maximum temperature. If the measured temperature is less than the maximum temperature, then the diagnostic test 425 will proceed to step 515. In step 615, the controller indicates an error in the air intake manifold 82 in response to the measured exhaust gas temperature being below the maximum temperature and proceeds to step 630. The turbocharger check (step 425 and step 625) is shown in FIG. 5 according to one aspect of the disclosure. If the measured temperature is greater than the maximum temperature, then then the diagnostic test 425 will proceed to step 620. In step 620, the controller indicates a turbocharger 66, 92, 94, 96 error in response to the exhaust gas temperature being above the maximum temperature.

The diagnostic test 325 depicted in FIG. 4 is based on the pressure of the intake manifold 82, whereas the diagnostic test 425 depicted in FIG. 6 uses the temperature of the exhaust gas to indicate an error with the turbocharger 66, 92, 94, 96 or the intake manifold 82. Either diagnostic test 325, 425 may be used to determine the cause of the anomaly in the turbocharger 66, 92, 94, 96 speed. In some aspects of the present disclosure, the controller 46 may use both the exhaust gas temperature and the intake manifold 82 pressure to determine whether the problem exists with one of the turbochargers 66, 92, 94, 96 or the air induction system 14. However, the information may be duplicative. For example, if the pressure of the intake manifold 82 is too low, then the temperature of the exhaust gas will tend to be too high for proper turbocharger 66, 92, 94, 96 operation.

Once it has been determined that the anomaly in turbocharger 66, 92, 94, 96 speed is the result of a problem with the air induction system 14, there are several actions that may be taken to overcome this problem. The process 300, for example, may further include adjusting air flow to the power source 12, which will have the effect of throttling back the power source 12. This may occur by adjusting the position of the induction valves 21 to increase the flow of air through the air inlet passageway 30 and to the intake manifold 82. If this step is unsuccessful, the process 300 may include increasing the amount of fuel delivered to the combustion chambers 22 to compensate for the decreased amount of air provided to the intake manifold 82. Otherwise, the power source 12 should be disabled to prevent damage to the power source 12.

Referring to FIG. 5, there is shown a detailed flow diagram of the steps for performing the turbocharger 66, 92, 94, 96 check (step 500) depicted in FIG. 4. The first step 505 of the turbocharger check 500 is to check the first turbocharger bank. For the power source 12 shown in FIG. 2, the first turbocharger bank includes first and second turbochargers 66, 92 that form the upper turbocharger bank. In step 505, the controller 46 determines $P_{abs(1)}$, the absolute value of the difference between the differential pressures ($\Delta p1$, $\Delta p2$) for the first and second turbochargers 66, 92. For example, $P_{abs(1)}=\Delta p1-\Delta p2$.

In step 510, the absolute value of the difference, $P_{abs(1)}$ obtained in step 505 is compared with the threshold difference. If the absolute value of the difference $P_{abs(1)}$ is greater than the threshold difference, then the turbocharger check 500 proceeds to step 515.

In step 515, the controller 46 may promptly disable the power source 12 to prevent damage. Otherwise, the turbocharger check 500 proceeds to step 520. In step 520, a check on the second turbocharger bank is performed. For the power source 12 shown in FIG. 2, the second turbocharger bank includes third and fourth turbochargers 94, 96 that form the lower turbocharger bank. In step 520, the controller 46 determines the absolute value $P_{abs(2)}$ of the difference between the differential pressures $\Delta p3$, $\Delta p4$ for the third and fourth turbochargers 94, 96. For example, $P_{abs(2)}=\Delta p3-\Delta p4$.

In step 525, the absolute value of the difference $P_{abs(2)}$ obtained in step 520 is compared with the threshold difference. If the absolute value of the difference $P_{abs(2)}$ is greater than the threshold difference, then the turbocharger check 500 proceeds to step 515. In step 515, the controller 46 may promptly disable the power source 12 to prevent damage. Otherwise, the turbocharger check 500 proceeds to step 530.

In step 530, the controller 46 indicates that turbocharger maintenance should be performed. Because the controller 46 has not disabled the power source 12, the anomaly in turbocharger speed does not exist among turbochargers 66, 92, 94, 96 that form the same bank in a power source 12 having a V-configuration. Therefore, the power source 12 may continue to operate within certain operating parameters until maintenance and repair is conducted on the turbochargers 66, 92, 94, 96. The control system 44 may, for example, adjust operation of the power source 12 to compensate for the faulty turbocharger 66, 92, 96, 98 until turbocharger maintenance and/or repair is conducted. In some aspects, the controller 46 may send the appropriate signals to the control system 44 such that the power source 12 is not operated above certain speeds and/or above a certain load.

INDUSTRIAL APPLICABILITY

The disclosed work machine and process may find applicability in any system having multiple turbochargers where turbocharger performance is a concern. Such applications may include any number of construction, mining, power generation, on-highway transportation, off-highway transportation, and/or marine applications. Accordingly, the disclosed work machine may be configured for use on, in, or with any vehicle or machine commonly used in such applications. Such machines may include, for example, wheel loaders, motor graders, excavators, on-highway vehicles, off-highway vehicles, marine vessels, and/or other known machines associated with such applications.

The disclosed process may be implemented on turbochargers of varying sizes and/or for turbochargers that are arranged or connected in parallel and/or in series. The disclosed process may also allow for symmetrical and asymmetrical sizing of turbochargers as well as high and low boost applications.

The disclosed process may detect anomalies in turbocharger speed to prevent turbocharger failure. One advantage of the process and system of the disclosure is that a malfunctioning turbocharger may be removed for servicing or replacement prior to failure of the turbocharger. This ultimately reduces and minimizes the probability that a turbocharger related failure will adversely impact the operational efficiency of the engine, and may cause damage to the engine system. Furthermore, the process and system of the disclosure prevents premature service of the turbocharger. In addition, the process and system of the disclosure may diagnose certain problem with the turbocharger by monitoring the certain operation parameters of the engine system such as inlet pressure and exhaust gas temperature at the inlet turbine.

It will be apparent to those skilled in the art that various modifications and variations can be made to the disclosed work machine and process. Other embodiments will be apparent to those skilled in the art from consideration of the specification and practice of the disclosed work machine and process. It is intended that the specification and examples be considered as exemplary only, with a true scope being indicated by the following claims and their equivalents.

What is claimed is:

1. A machine comprising:

a power source including an engine and an intake manifold for supplying the power source an with air flow;

a plurality of turbochargers, wherein one of the plurality of the turbochargers:

an air inlet passageway to receive air, a plurality of pressure sensors arranged within the inlet passageway configured to monitor a differential pressure across the air inlet passageway, a compressor configured to pressurize air, an air outlet passageway to direct pressurized air from the compressor to the intake manifold, and an exhaust turbine operably driven by exhaust gas from the power source and coupled to the compressor by a turbine shaft, an air inlet valve positioned upstream of said one of the plurality of the turbochargers and being operable to change a rate of the air flow passing through the air inlet passageway to the compressor, wherein the differential pressure across the air inlet passageway of said one of the plurality of the turbochargers is proportional to a speed of the turbine shaft; and a controller in communication with the plurality of pressure sensors, wherein the controller is configured to detect an anomaly in turbocharger speed of said one of the turbochargers based on at least the differential pressure across the air inlet passageway, to adjust the air inlet valve, and to disable operation of the engine.

2. The machine of claim 1, wherein the anomaly in the turbocharger speed occurs when the differential pressure of said one of the plurality of the turbocharger exceeds the differential pressure of another one of the plurality of the turbochargers by a threshold amount.

3. The machine of claim 1, wherein the plurality of the turbochargers comprises a first turbocharger and a second turbocharger connected in parallel.

4. The machine of claim 1, further comprising an air filter arranged within the air inlet passageway and being upstream of said one of the plurality of the turbochargers to filter the air flow before entering the compressor, wherein the plurality of the pressure sensors is configured to monitor the differential pressure across the air filter.

5. The machine of claim 1, further comprising an additional pressure sensor positioned within the intake manifold and in communication with the controller, wherein the additional pressure sensor is configured to sense an air pressure in the intake manifold in response to the anomaly in turbocharger speed, and wherein the controller is configured to (a) indicate an engine air system error if the air pressure is below a threshold pressure or (b) indicate a turbocharger error if the air pressure is above a threshold pressure.

6. The machine of claim 1, further comprising a temperature sensor positioned at an inlet to the exhaust turbine of said one of the plurality of the turbochargers and in communication with the controller, wherein the temperature sensor is configured to sense the temperature of exhaust gas at the inlet to the exhaust turbine in response to the anomaly in turbocharger speed, and wherein the controller is configured to (a) indicate an engine air system error if the temperature is above a maximum threshold temperature or (b) indicate a turbocharger error if the exhaust gas temperature is below a maximum threshold temperature.

7. The machine of claim 1, wherein the controller is configured to close the air inlet valve to stop the air flow to the compressor in response to the turbocharger error.

8. The machine of claim 1, wherein the plurality of the turbochargers comprises a first pair of the turbochargers and a second pair of the turbochargers, each pair including a first and a second turbocharger, wherein the first pair and the second pair of the turbochargers are connected in parallel, and wherein the first turbocharger and the second turbocharger of the first pair and the second pair of the turbochargers are connected in parallel.

9. The machine of claim 8, wherein the controller is configured to disable operation of the engine when (a) the difference in differential pressure between the first turbocharger of the first pair of turbochargers and the first or the second turbocharger of the second pair of turbochargers exceeds a threshold amount or (b) the difference in differential pressure between the second turbocharger of the first pair of turbochargers and the first or the second turbocharger of the second pair of the turbochargers exceeds a threshold amount.

* * * * *